(12) United States Patent
Beaulieu et al.

(10) Patent No.: US 7,277,604 B2
(45) Date of Patent: Oct. 2, 2007

(54) METHOD AND APPARATUS FOR INDUCING AN INDEX OF REFRACTION CHANGE ON A SUBSTRATE SENSITIVE TO ELECTROMAGNETIC RADIATION

(75) Inventors: Claude Beaulieu, Pierrefonds (CA); Paul Lefebvre, Laval (CA); Gilles L. Tourte, Montreal (CA); André R. Vincelette, Rouyn-Noranda (CA)

(73) Assignee: Lxsix Photonics inc., St-Laurent, Quebec (CA)

( * ) Notice: Subject to any disclaimer, the term of this patent is extended or adjusted under 35 U.S.C. 154(b) by 0 days.

(21) Appl. No.: 10/733,325

(22) Filed: Dec. 12, 2003

(65) Prior Publication Data

US 2005/0130340 A1 Jun. 16, 2005

(51) Int. Cl.
*G02B 6/34* (2006.01)
*G02F 1/295* (2006.01)

(52) U.S. Cl. .............................. 385/10; 385/37
(58) Field of Classification Search .................. 385/37, 385/1, 2, 3, 5, 8, 10
See application file for complete search history.

(56) References Cited

U.S. PATENT DOCUMENTS

| | | |
|---|---|---|
| 5,104,209 A | 4/1992 | Hill et al. |
| 5,367,588 A | 11/1994 | Hill et al. |
| 5,478,371 A | 12/1995 | Lemaire et al. |
| 5,652,818 A | 7/1997 | Byron |
| 5,655,040 A | 8/1997 | Chesnoy et al. |
| 5,730,888 A | 3/1998 | Byron |
| 5,748,814 A | 5/1998 | Painchaud et al. |
| 5,830,622 A | 11/1998 | Canning et al. |
| 5,857,043 A | 1/1999 | Cook et al. |
| 5,903,689 A | 5/1999 | Painchaud et al. |
| 5,912,999 A | 6/1999 | Brennan, III et al. |
| 5,930,420 A | 7/1999 | Atkins et al. |
| 5,953,471 A * | 9/1999 | Espindola et al. ............ 385/37 |
| 6,004,703 A | 12/1999 | Jang et al. |
| 6,035,083 A | 3/2000 | Brennan, III et al. |
| 6,043,497 A | 3/2000 | Quetel et al. |
| 6,067,391 A * | 5/2000 | Land ........................... 385/27 |
| 6,072,927 A | 6/2000 | Iwashima et al. |
| 6,084,998 A | 7/2000 | Straayer |
| 6,130,973 A | 10/2000 | Lauzon et al. |
| 6,169,830 B1 | 1/2001 | Kewitsch et al. |
| 6,204,969 B1 | 3/2001 | Jang |
| 6,256,435 B1 | 7/2001 | Albert et al. |
| 6,278,817 B1 | 8/2001 | Dong |
| 6,307,679 B1 | 10/2001 | Kashyap |
| 6,330,383 B1 | 12/2001 | Cai et al. |
| 6,374,016 B2 | 4/2002 | Albert et al. |
| 6,404,956 B1 | 6/2002 | Brennan, III et al. |
| 6,408,119 B1 | 6/2002 | Meltz et al. |
| 6,415,081 B1 | 7/2002 | Levner et al. |
| 6,441,962 B1 | 8/2002 | Bakhti et al. |
| 6,456,762 B1 | 9/2002 | Nishiki et al. |

(Continued)

*Primary Examiner*—K. Cyrus Kianni

(57) ABSTRACT

An apparatus for inducing a modification of the index of refraction of a substrate sensitive to electromagnetic radiation. The apparatus is capable of generating a first beam of electromagnetic radiation and a second beam of electromagnetic radiation that is different from the first beam. The first and the second beams converge toward a treatment area on the substrate, which is illuminated with electromagnetic radiation. The first beam and the second beam interact to create an interference pattern over a limited portion of the treatment area.

37 Claims, 5 Drawing Sheets

U.S. PATENT DOCUMENTS

| | | |
|---|---|---|
| 6,465,153 B1 | 10/2002 | Kewitsch et al. |
| 6,545,808 B1 | 4/2003 | Ehbets et al. |
| 6,553,163 B2 * | 4/2003 | Tormen ................ 385/37 |
| 6,574,395 B1 | 6/2003 | Mechin et al. |
| 6,591,039 B2 | 7/2003 | Rondinella et al. |
| 6,771,857 B1 * | 8/2004 | Domash et al. ........... 385/37 |
| 2001/0008466 A1 | 7/2001 | Kim et al. |
| 2001/0014200 A1 | 8/2001 | Albert et al. |
| 2001/0021294 A1 | 9/2001 | Cai et al. |
| 2001/0031114 A1 | 10/2001 | Kashyap |
| 2001/0043774 A1 * | 11/2001 | Tormen ................ 385/37 |
| 2001/0051020 A1 | 12/2001 | Kashyap |
| 2002/0015919 A1 * | 2/2002 | Kristensen et al. ........ 430/321 |
| 2002/0122628 A1 | 9/2002 | Brennan, III et al. |
| 2002/0186924 A1 | 12/2002 | Kohnke et al. |
| 2003/0007729 A1 | 1/2003 | Rondinella et al. |
| 2003/0007732 A1 | 1/2003 | Ronnekleiv |
| 2003/0035623 A1 | 2/2003 | Wilcox et al. |
| 2003/0053732 A1 | 3/2003 | Eldada |
| 2003/0107786 A1 | 6/2003 | Bablumyan |
| 2003/0107787 A1 | 6/2003 | Bablumyan |
| 2003/0108802 A1 | 6/2003 | Bablumyan |
| 2004/0008413 A1 * | 1/2004 | Trepanier et al. ......... 359/557 |

* cited by examiner

METHOD AND APPARATUS FOR INDUCING AN INDEX OF REFRACTION CHANGE ON A SUBSTRATE SENSITIVE TO ELECTROMAGNETIC RADIATION

FIELD OF THE INVENTION

The invention relates to a method and to an apparatus for altering the index of refraction of a substrate, such as a waveguide. The invention can be used to fabricate Bragg gratings over optical fibers.

BACKGROUND OF THE INVENTION

An optical waveguide, such as an optical fiber is formed by a core section transporting the electromagnetic radiation, such as a light beam, and a cladding section that surrounds the core to confine the electromagnetic radiation to the core. The electromagnetic radiation remains captive in the core by virtue of the difference between the refractive indexes of the core and the cladding sections and their geometries. In an optical fiber, the core section is cylindrical and the cladding surrounding it is tubular and in contact with the cylindrical core.

A Bragg grating is an axial periodical change of the refractive index (n) between the core and the cladding that induces harmonic back reflections of the light beam at a certain wavelength ($\lambda$) called the Bragg wavelength. The Bragg wavelength is related to the period length ($\Lambda$) of the refractive index change by $\lambda=2\ n\Lambda$.

Since Bragg gratings have a short period length ($\Lambda$) of index change, this periodic index change is usually created by interfering two coherent energy beams to form a stationary energy interference pattern along a section of the core of the waveguide. This stationary energy interference pattern will induce a periodic change in the material structure of the exposed section of the core, leading to the axial periodical change of the effective refractive index (n) between the core and the cladding. A known approach to form a grating in a waveguide, particularly in an optical fiber, is to expose the core of the waveguide to a stationary interference pattern generated by the crossing over of two Ultra Violet (UV) coherent laser beams, where the interference angle dictates the period. The exposure to the interference pattern initiates semi-permanent material structure changes in the core region. By using proper annealing, one can remove the most unstable part of this semi-permanent material structure changes and obtain, in practice, a permanent grating.

A periodical change of the refractive index in amplitude, as shown in FIG. 1, will create a Bragg grating with a specific reflection spectrum shape, shown in FIG. 2. The percentage of light reflected will follow a Gaussian distribution shape around the Bragg wavelength, with predetermined side lobe positions and relative levels. As the level of amplitude increases, the Gaussian distribution saturates at the maximal 100% reflection, and the side lobe relative levels increase, as shown in FIG. 3.

A distribution in amplitude of the periodical change of the refractive index, also called apodization, will change the shape, or distribution, of the reflection spectrum of the Bragg grating, as well as the relative levels of the side lobes. FIG. 4 shows a Gaussian type apodization, or axial amplitude profile of the periodical change of the refractive index, and FIG. 5 shows the corresponding reflection spectrum for a saturated Bragg grating. It can be seen that the effect of the Gaussian apodization is to increase the slope of the reflection spectrum and to lower the side lobes level. However, this type of Gaussian apodization produces a non-uniform base value index change, of Gaussian shape, which creates a resonant cavity effect at lower wavelengths and produces one or more undesirable bumps in the reflection spectrum. In FIG. 4, the base refractive index value is shown as a continuous thick line superimposed over the Gaussian type apodization. To compensate for the base level change of the refractive index, one can use a double Gaussian amplitude distribution around the uniform average refractive index, such as shown in FIG. 6. In this instance, the base refractive index value is constant, as shown by the straight continuous thick line in the graph. The associated reflection spectrum, shown in FIG. 7, will then be symmetrical against the Bragg wavelength with sharper slopes and lower side lobe levels.

Currently available methods to create an apodization on a waveguide, such as the one depicted in FIG. 6 are unsatisfactory for a variety of reasons and there is a need in the industry to provide an improved technique and an associated apparatus to perform such operations.

SUMMARY OF THE INVENTION

In a first broad aspect, the invention provides an apparatus for treating a substrate sensitive to electromagnetic radiation. The apparatus is capable of generating a first beam of electromagnetic radiation and a second beam of electromagnetic radiation that is different from the first beam. The first and the second beams converge toward a treatment area on the substrate, which is exposed to electromagnetic radiation. The first beam and the second beam interact to create an interference pattern over a limited portion of the treatment area.

In a specific and non-limiting example of implementation, the apparatus is used to treat substrates that are waveguides, such as optical fibers, among other possible types of substrates that may not necessarily be waveguides. The apparatus has a source of electromagnetic radiation, such as a UV laser. The source UV laser beam is passed through a diffraction mask to produce a first UV beam and a second UV beam that belong to different diffractive orders. The first and the second UV beams are then passed through respective masks that condition the beams by imparting to the beams selected cross-sectional shapes. The first and the second conditioned UV beams are directed toward the treatment area of the optical fiber. The treatment area is, therefore, exposed to UV radiation, in a non-uniform manner. The outer portion of the treatment area is exposed to only one of the UV beams, which creates a generally uniform refractive index change. The central portion of the treatment area is exposed to both of the UV beams, which interact to create an interference pattern, forming a Bragg grating.

In a second broad aspect, the invention provides a substrate sensitive to electromagnetic radiation having an index of refraction modified by the apparatus broadly defined above.

In a third broad aspect, the invention provides a method for inducing a modification of the index of refraction of a substrate sensitive to electromagnetic radiation. The method comprises generating a first beam of electromagnetic radiation and a second beam of electromagnetic radiation that is different from the first beam. The method further includes directing the first and the second beams of electromagnetic radiation toward the substrate to expose a treatment area of the substrate, the first and the second beams interacting to create an interference pattern over a limited portion of the treatment area.

In a fourth broad aspect, the invention provides a substrate sensitive to electromagnetic radiation having an, index of refraction modified by the method broadly defined above.

BRIEF DESCRIPTION OF THE DRAWINGS

A detailed description of examples of implementation of the present invention is provided hereinbelow with reference to the following drawings, in which.

Figure 1:
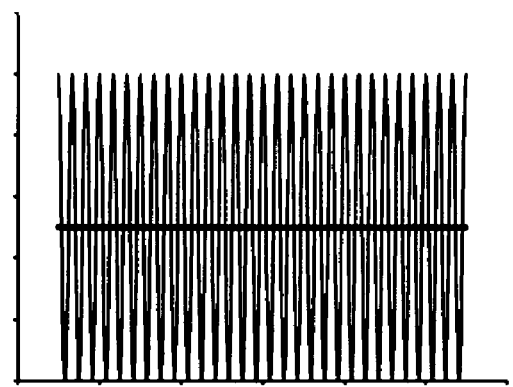
FIG. 1 is a graph showing a Bragg grating having a uniform amplitude profile.
Figure 2:
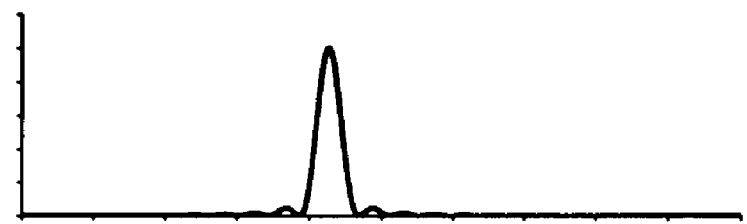
FIG. 2 is a graph showing the reflection spectrum corresponding to the Bragg grating of FIG. 1, in a non-saturated condition.
Figure 3:
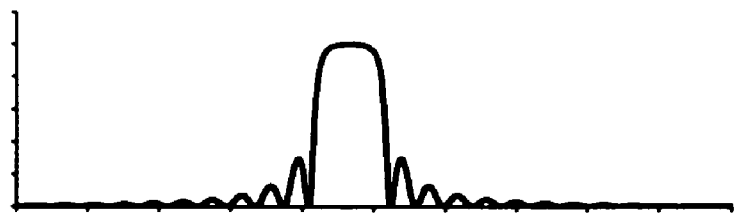
FIG. 3 is a graph showing the reflection spectrum corresponding to the Bragg grating of FIG. 1, in a saturated condition.
Figure 4:
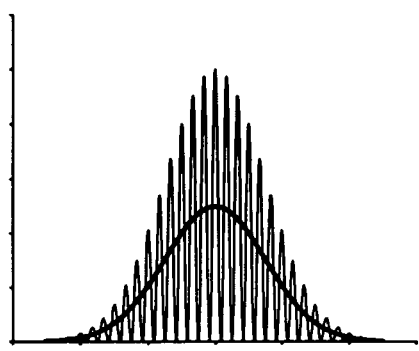
FIG. 4 is a graph showing a Bragg grating having a Gaussian amplitude profile.
Figure 5:
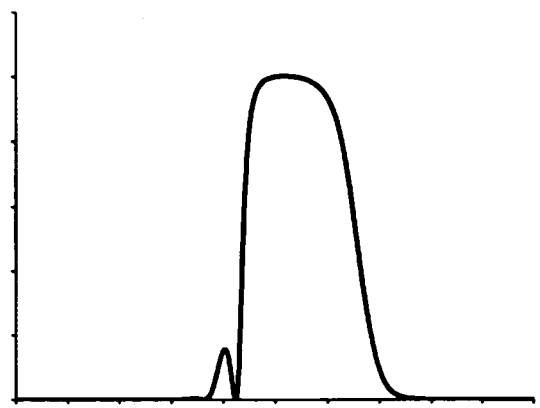
FIG. 5 is a graph showing the reflection spectrum corresponding to the Bragg grating of FIG. 4.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

Figure 8A:
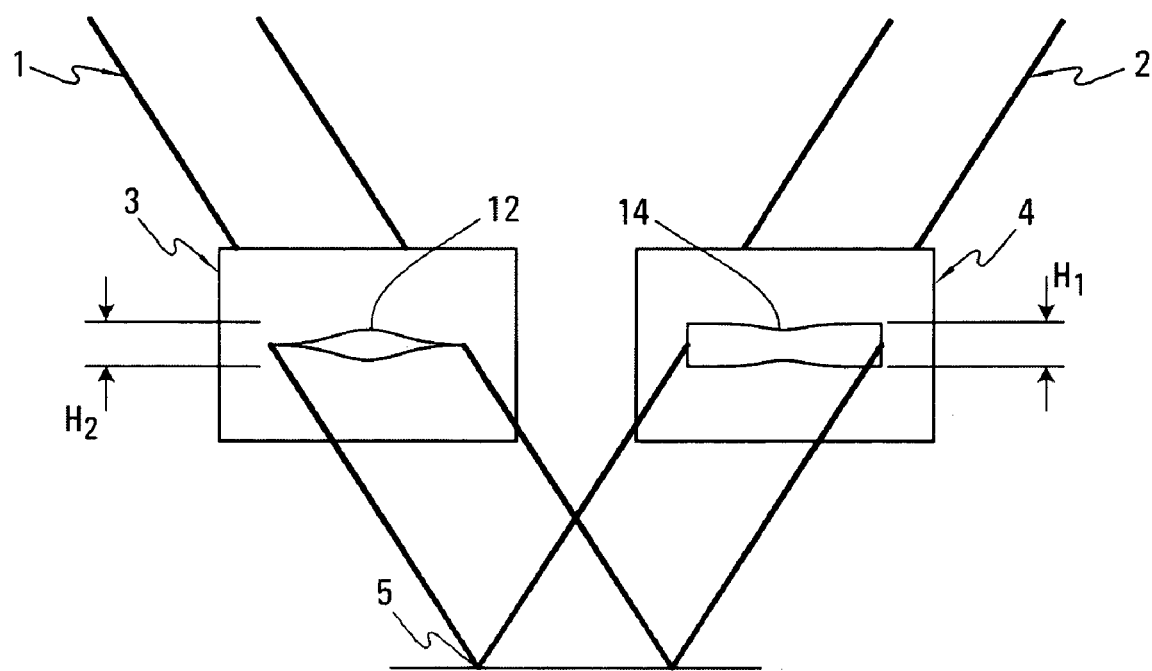
FIG. 8a is a diagrammatic representation of an apparatus according to a non-limiting example of implementation of the invention for producing the Bragg grating of FIG. 6.

FIG. 8a is a diagrammatic representation of an apparatus for inducing a modification of the refractive index in a photosensitive substrate. In the specific and non-limiting example of implementation, the substrate is a waveguide, such as an optical fiber on which is formed a Bragg grating, however it should be expressly noted that other photosensitive substrates could be processed with the apparatus and the method according to the invention without departing from the spirit of the invention. In addition, the invention may also find applications where the modification of the refractive index imparted to the substrate produces something other than a Bragg grating.

In FIG. 8a, the reference numeral 5 designates the surface of the optical fiber on which the Bragg grating is to be formed. A pair of beams of electromagnetic radiation 1, 2 are directed at the surface 5. In a specific example of implementation, the beams 1, 2 are coherent beams of light, such as UV laser light. The beams 1, 2 belong to different diffractive orders such as to create an interference pattern, as it will be described below.

The beams 1, 2 are directed to respective masks 3, 4 that condition the beams. In this example, the type of conditioning performed on the beams 1, 2 resides in a modification of the cross-sectional shape of each beam. Specifically, the mask 3 will impart to the beam 1 a cross-sectional shape that corresponds to the envelope of the double Gaussian amplitude profile of the Bragg grating to be created on the surface 5 of the optical fiber. In contrast, the mask 4 will impart to the beam 2 a cross-sectional shape that generally corresponds to the outline of the treatment area on the surface 5.

Figure 6:
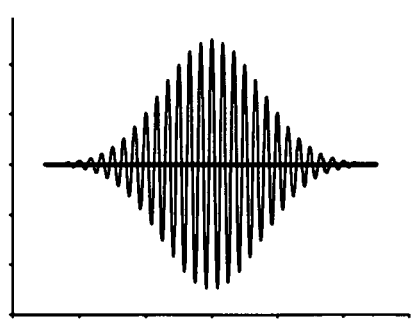
FIG. 6 is a graph showing a Bragg grating having a double Gaussian amplitude profile and combined to a uniform base refractive index variation.
Figure 7:
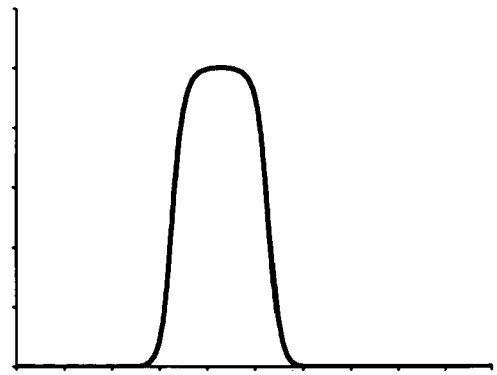
FIG. 7 is a graph showing the reflection spectrum corresponding to the Bragg grating of FIG. 6.
Figure 8B:
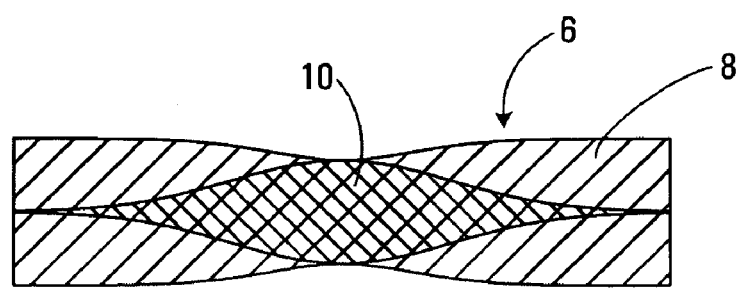
FIG. 8b illustrates the area of the substrate exposed to electromagnetic radiation by the apparatus of FIG. 8a to create the Bragg grating of FIG. 6.

The treatment area 6 is shown in FIG. 8b. The treatment area 6 has two distinct portions 8 and 10 that are shown in FIG. 8b as surfaces having different cross-hatching patterns. The surface 8 is exposed only to the beam conditioned by the mask 4 and has an outline that corresponds to the outline of the beam conditioned by the mask 4. In contrast, the surface 10, which is of a lesser extent than the surface 8, is exposed to the beams conditioned by both masks 3, 4. The outline of the surface 10 corresponds to cross-sectional shape of the beam conditioned by the mask 3. Since the beams conditioned by masks 3, 4 overlap over the surface 10, they create an interference pattern that forms a Bragg grating having a double Gaussian amplitude shape, of the type shown in FIG. 6. On the other hand, the surface 8 that is exposed to a single beam undergoes a generally uniform refractive index change. Therefore, the resulting Bragg grating will have a double Gaussian apodization contained in the surface 10 with a base index value that is generally constant.

In the example of implementation of the invention shown in FIGS. 8a and 8b the height H1 of the mask 4 is twice the height H2 of the mask 3, and the curvature 12 of the mask 3 is the inverse of the curvature 14 of the mask 4. When the light beams emerging from the masks 3, 4 have the same intensity, focusing rate and distance path to the treatment area 6, this mask geometry will provide an energy exposure such as to create the Bragg grating of FIG. 6.

The reader will recognize that by varying the various parameters of the apparatus illustrated at FIG. 8a, a wide variety of effects can be accomplished on the substrate surface 5.

Figure 9:
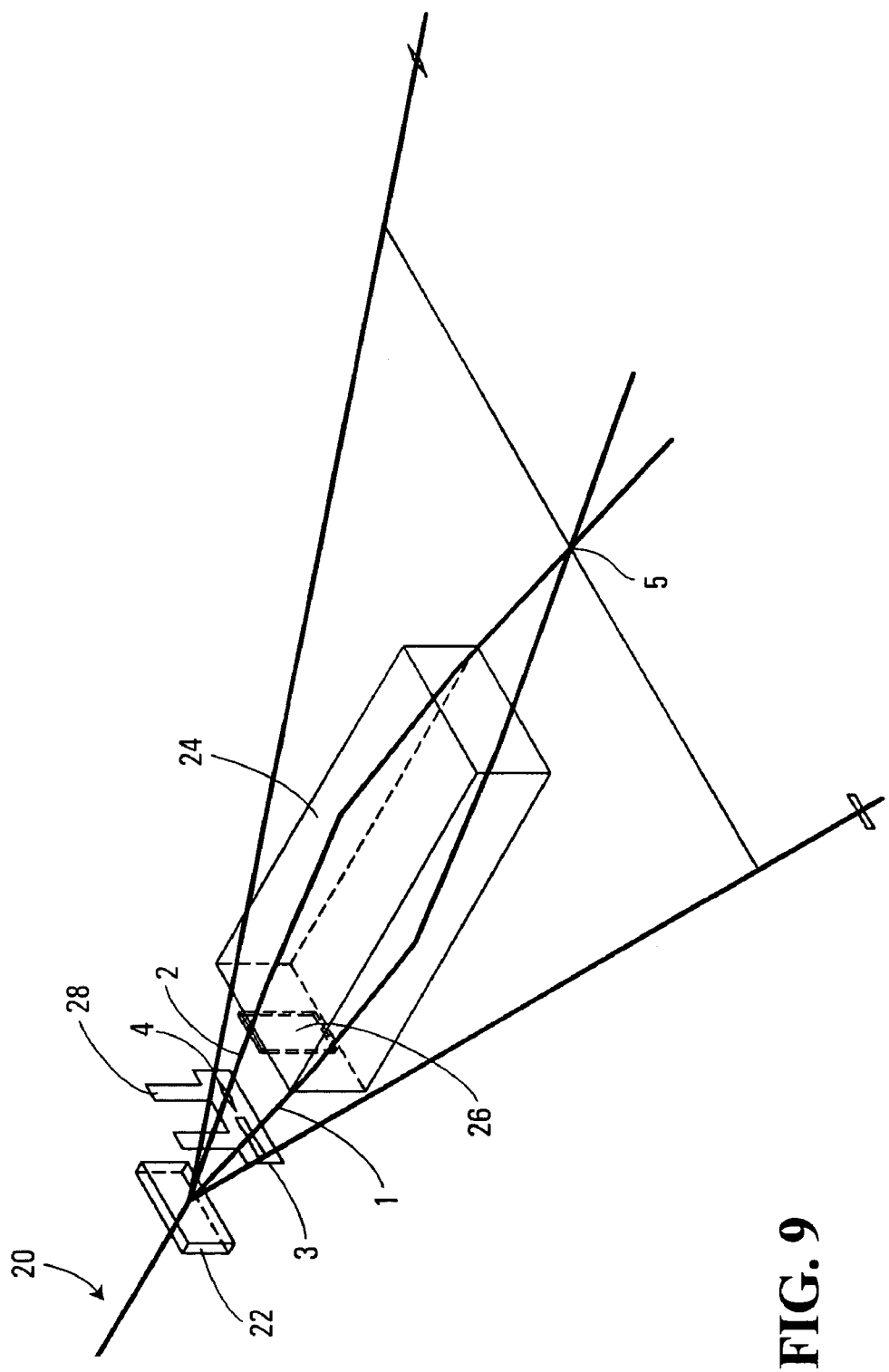
FIG. 9 is a more detailed perspective view of the apparatus for producing the Bragg grating of FIG. 6, according to a non-limiting example of implementation of the invention.

FIG. 9 is a perspective view of the same apparatus illustrated at FIG. 8a, showing additional components. An incoming UV beam 20 generated by a 244 nm laser is split into multiple beams that belong to different diffractive orders by a non-apodized phase mask 22. Note that different sources of energy can be used, including a series of UV lasers having different wavelengths. The UV laser beam can also be optically modified before reaching the phase mask 22, including but not limited to, expanded, collimated, polarized and focalized. Other optical elements can be used instead of a phase mask to obtain at least two beams, without departing from the invention, such as using a pair of UV lasers, each generating a separate beam.

From the multiple orders of diffraction produced by the phase mask 22, only the beams 1, 2 that belong to the diffractive orders −1 and +1 enter a rectangular prism 24 having totally reflective sides. A shadow mask 26 located in front of the prism 24 blocks the 0 order beam produced by the phase mask 22. Beams having a higher order of diffraction have trajectories that clear the prism 24. Otherwise, they could be blocked by using one or more shadow masks such as the shadow mask 26.

A thin sheet 28 of UV opaque material, such as metal is placed between the phase mask 22 and the prism 24. The masks 3, 4 described earlier are implemented on the thin sheet by cutting into the thin sheet 28 the apertures designed to condition the beams 1, 2. The beams conditioned by the masks 3, 4 enter the prism 24, totally reflect on its opposite sides and are re-directed toward the surface 5, which in this example is the core of an optical fiber. The conditioned beams are directed over respective paths that converge toward the surface 5 and they will expose the treatment area on the surface 5 with electromagnetic radiation, as described earlier in connection with FIG. 8.

It should be expressly noted that an optical system different from the prism 24 could be used to re-direct the beams conditioned by the masks 3, 4 toward the surface 5, without departing from the spirit of the invention.

Although not shown in the drawings, it has been found advantageous to place a focusing lens in the path of each conditioned beam to focalize the entire energy of each beam on the treatment surface.

Figure 10A:
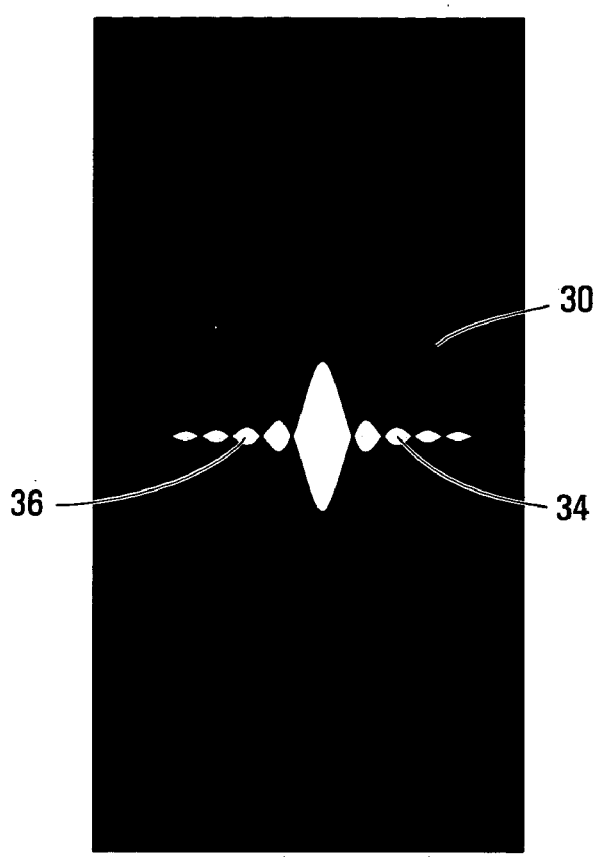
FIGS. 10a and 10b illustrate another example of masks that can be used as the apparatus shown in FIG. 9.
Figure 10B:
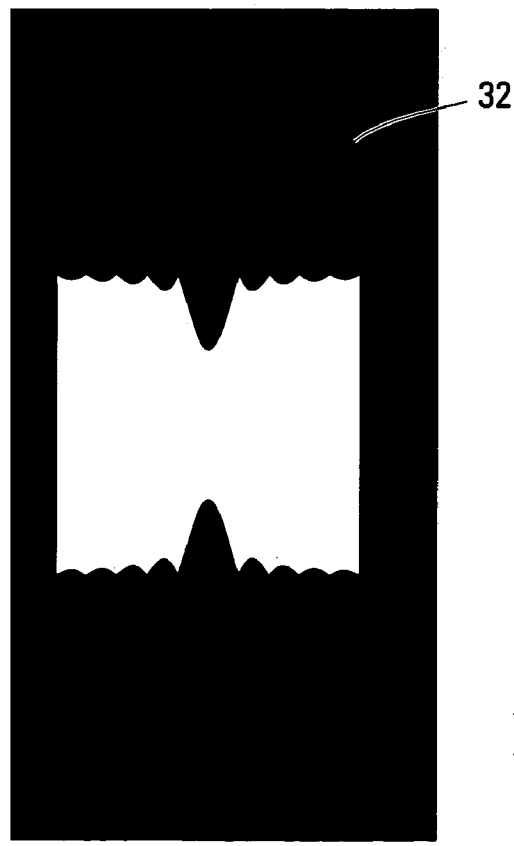

FIGS. 10a and 10b illustrate another example of masks that can be used to create a Bragg grating. The masks 30 and 32 are generally similar to the masks 3 and 4 with the added feature of introducing a phase shift in at least one of the beams conditioned by the masks 30 and 32. Specifically, each mask 30, 32 is made from a plate of glass or any other suitable material with an opaque coating whose outline defines the desired cross-sectional shape to be imparted to each beam reaching the mask 30, 32. In order to provide phase control in one or both masks 30, 32 the thickness of the transparent areas of the masks 30, 32 are non-uniform. For example, the areas 34, 36 of the mask 30 are somewhat thinner than the remainder of the mask 30. As it will be apparent to a person skilled in the art, the non-uniform thickness will introduce a phase shift in the beam. The phase shift feature provides an added degree of control on the distribution of the energy on the substrate surface 5 in creating the Bragg grating.

It will be apparent to a person skilled in the art that the characteristics of the phase shift such as the degree of phase shift imparted to the beam, the zones of the beam that are subjected to a phase shift, among others, can widely vary without departing from the spirit of the invention.

In a non-limiting example, the mask 30, 32 with the phase shift feature can be made by etching the areas of the glass plate where the reduced thickness is desired. It will be apparent to a person skilled in the art that the other ways to provide the mask 30, 32 with a non-uniform thickness can be used without departing from the spirit of the invention.

Various modifications to the apparatus and its method of operation can be considered without departing from the spirit of the invention.

In a first possibility, the ratio between the surfaces 8 and 10 of the treatment area 6 can be varied by using individually adjustable focalizing lenses for each of the beams conditioned by the masks 3, 4, and changing either the relative focalizing rates or the relative focalizing path lengths. One can also consider using a simple mechanism, such as a shutter to block temporarily one of the beams conditioned by the masks 3, 4 to change the ratio between the surfaces 8 and 10. Yet, another possibility is to use masks 3, 4 providing dynamically variable apertures. Such masks could be made from liquid-crystal polymer that can provide an aperture whose size, location and shape can be electronically varied.

In a second possibility, the apparatus can be provided with a grating growth in-situ monitoring, of the type known in the art, that outputs a feed-back signal which can be used to dynamically adjust the operation of the apparatus such as to achieve the desired result.

In a third possibility, the apparatus of FIG. 9 can be used to create a hydrogen profile in the substrate surface 5 by first loading the substrate surface 5 with hydrogen by using any suitable technique and then treating the substrate surface 5 in the apparatus of FIG. 9. The two beams illuminating the treatment area create a thermal profile on the surface of the substrate surface 5, where more thermal energy is concentrated in the fringes of the interference pattern than between the fringes. This thermal energy pattern will produce a corresponding hydrogen loading pattern, due to the fact that hydrogen will migrate out of the substrate surface 5 at a rate that is functional of the thermal energy input. In other words, the areas of the substrate surface 5 that are heated more will out-gas more hydrogen than the areas heated less. The result of this operation is a substrate surface 5 having a desired hydrogen profile.

To create such hydrogen profile it has been found advantageous to use a $CO_2$ laser as a source of coherent light.

Once the hydrogen profile has been created the substrate surface 5 can be exposed to uniform, even non coherent, UV light. The hydrogen concentration profile will result in a photo-sensitivity profile, and so in an effective index profile in the substrate surface 5.

It should be noted that the various examples of implementation of the invention can be practiced with different forms of treatment area exposition such as flooding exposition, a scanning exposition or a multi-sweeping exposition.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. An apparatus for treating a substrate sensitive to electromagnetic radiation, comprising;
   a) a first mask for conditioning a first beam of electromagnetic radiation and producing a first conditioned beam of electromagnetic radiation;
   b) a second mask for conditioning a second beam of electromagnetic radiation and producing a second conditioned beam of electromagnetic radiation;
   the first and the second conditioned beams of electromagnetic radiation being characterized in that, when they are directed toward the substrate sensitive to electromagnetic radiation, a treatment area of the substrate sensitive to electromagnetic radiation is exposed to electromagnetic radiation, the treatment area including:
   a first portion exposed to only one of the first and the second conditioned beams of electromagnetic radiation; and
   a second portion exposed to both the first and the second conditioned beams of electromagnetic radiation to create an interference pattern over the second portion;
   the first and the second conditioned beams of electromagnetic radiation inducing an index of refraction change in the substrate sensitive to electromagnetic radiation, the index of refraction of the substrate sensitive to electromagnetic radiation being modified differently over the first portion than over the second portion, the index of refraction being altered substantially uniformly over the first portion, the index of refraction being altered in a non-uniform manner over the second portion.

2. An apparatus as defined in claim 1, wherein the substrate sensitive to electromagnetic radiation is a waveguide.

3. An apparatus as defined in claim 2, wherein the index of refraction changes periodically over the second portion.

4. An apparatus as defined in claim 3, wherein the second portion forms a Bragg grating.

5. An apparatus as defined in claim 4, wherein the Bragg grating has an apodization.

6. An apparatus as defined in claim 5, wherein the apodization is a Gaussian apodization.

7. An apparatus as defined in claim 6, wherein the index of refraction is altered substantially uniformly over the first portion to form a base value, the Gaussian apodization being symmetrical on either side of the base value.

8. An apparatus as defined in claim 7, wherein the waveguide defines an electromagnetic radiation propagation axis, the Gaussian apodization forming an amplitude profile of the Bragg grating along the electromagnetic radiation propagation axis.

9. An apparatus as defined in claim 2, wherein the waveguide is an optical fiber.

10. An apparatus as defined in claim 9, wherein the first beam of electromagnetic radiation and the second beam of electromagnetic radiation belong to different diffractive orders.

11. An apparatus as defined in claim 10, comprising a source of electromagnetic radiation from which are derivable the first and the second beams of electromagnetic radiation.

12. An apparatus as defined in claim 11, comprising a diffractive mask subjected to exposition of electromagnetic radiation by the source of electromagnetic radiation to produce the first and the second beams of electromagnetic radiation.

13. An apparatus as defined in claim 12, including an optical system to focus the first and the second conditioned beams of electromagnetic radiation toward the optical fiber.

14. An apparatus as defined in claim 13, wherein said source of electromagnetic radiation is coherent.

15. An apparatus as defined in claim 14, wherein the coherent electromagnetic radiation is a UV laser.

16. A substrate sensitive to electromagnetic radiation having an index of refraction modified by the apparatus defined in claim 1.

17. An apparatus as defined in claim 1, wherein the first and the second conditioned beams of electromagnetic radiation induce a predetermined gaseous profile in the substrate.

18. An apparatus as defined in claim 17, wherein the gaseous profile is a hydrogen profile.

19. An apparatus as defined is claim 1, wherein said first mask imparts a first cross-sectional shape to the first beam of electromagnetic radiation, said second mask imparts a second cross-sectional shape to the second beam of electromagnetic radiation, the first cross-sectional shape being different from the second cross-sectional shape.

20. An apparatus as defined in claim 19, wherein said first mask imparts a phase shift to the first beam of electromagnetic radiation.

21. A method for inducing a modification of the index of refraction of a substrate sensitive to electromagnetic radiation, comprising;
a) conditioning with a first mask a first beam of electromagnetic radiation and producing a first conditioned beam of electromagnetic radiation;
b) conditioning with a second mask a second beam of electromagnetic radiation and producing a second conditioned beam of electromagnetic radiation;
c) directing the first and the second conditioned beams of electromagnetic radiation toward the substrate sensitive to electromagnetic radiation to expose a treatment area of the substrate to electromagnetic radiation, the treatment area including:
a first portion exposed to only one of the first and the second conditioned beams of electromagnetic radiation; and
a second portion exposed to both the first and the second conditioned beams of electromagnetic radiation to create an interference pattern over the second portion;
the index of refraction of the substrate sensitive to electromagnetic radiation being modified differently over the first portion than over the second portion, the index of refraction being altered substantially uniformly over the first portion, the index of refraction being altered in a non-uniform manner over the second portion.

22. A method as defined in claim 21, wherein the substrate sensitive to electromagnetic radiation is a waveguide.

23. A method as defined in claim 22, wherein the index of refraction changes periodically over the second portion.

24. A method as defined in claim 23, wherein the second portion forms a Bragg grating.

25. A method as defined in claim 24, wherein the Bragg grating has an apodization.

26. A method as defined in claim 25, wherein the apodization is a Gaussian apodization.

27. A method as defined in claim 26, wherein the index of refraction is altered substantially uniformly over the first portion to form a base value, the Gaussian apodization being symmetrical on either side of the base value.

28. A method as defined in claim 27, wherein the waveguide defines an electromagnetic radiation propagation axis, the Gaussian apodization forming an amplitude profile of the Bragg grating along the electromagnetic radiation propagation axis.

29. A method as defined in claim 22, wherein the waveguide is an optical fiber.

30. A method as defined in claim 29, wherein the first beam of electromagnetic radiation and the second beam of electromagnetic radiation belong to different diffractive orders.

31. A method as defined in claim 30, comprising providing a source of electromagnetic radiation from which is derived the first and the second beams of electromagnetic radiation.

32. A method as defined in claim 31, comprising providing a diffractive mask exposed to electromagnetic radiation by the source of electromagnetic radiation to produce the first and the second beams of electromagnetic radiation.

33. A method as defined in claim 32, including providing an optical system to focus the first and the second conditioned beams of electromagnetic radiation toward the optical fiber.

34. A method as defined in claim 33, wherein said source of electromagnetic radiation is coherent.

35. A method as defined in claim 34, wherein the coherent electromagnetic radiation is a UV laser.

36. A substrate sensitive to electromagnetic radiation processed by the method defined in claim 21.

37. A method for inducing a modification of the index of refraction of a substrate sensitive to electromagnetic radiation, said method comprising:
a) generating a first beam of electromagnetic radiation and a second beam of electromagnetic radiation different from the first beam of electromagnetic radiation;
b) directing the first and the second beams of electromagnetic radiation toward the substrate sensitive to electromagnetic radiation to expose a treatment area on the substrate to electromagnetic radiation, the first and the second beams of electromagnetic radiation being such that the treatment area includes:
a first portion exposed to only one of the first and the second beams of electromagnetic radiation; and
a second portion exposed to both the first and the second beams of electromagnetic radiation to create an interference pattern over the second portion; the index of refraction of the substrate sensitive to electromagnetic radiation being modified differently over the first portion than over the second portion, the index of refraction being altered substantially uniformly over the first portion, the index of refraction being altered in a non-uniform manner over the second portion.

* * * * *